United States Patent [19]

Cooper, Jr. et al.

[11] Patent Number: 4,586,250

[45] Date of Patent: May 6, 1986

[54] APPARATUS FOR SLEEVING TUBES IN HOSTILE ENVIRONMENTS

[75] Inventors: Frank W. Cooper, Jr., Monroeville; John P. Vogeleer, Greensburg, both of Pa.

[73] Assignee: Westinghouse Electric Corp., Pittsburgh, Pa.

[21] Appl. No.: 538,320

[22] Filed: Oct. 3, 1983

[51] Int. Cl.$^4$ .................... B23P 15/26; B23P 19/00
[52] U.S. Cl. .................... 29/727; 29/400 N; 29/715; 29/723
[58] Field of Search ............ 29/400 N, 714, 715, 29/723, 726, 727, 709; 72/122, 125; 165/11 A; 414/749; 901/8, 24; 122/12, 16, 511, 512

[56] References Cited

U.S. PATENT DOCUMENTS

| | | | |
|---|---|---|---|
| 2,355,852 | 8/1944 | Fisher | 29/715 |
| 3,683,481 | 8/1972 | Blackburn et al. | 29/727 X |
| 3,688,533 | 9/1972 | Ames | 29/727 X |
| 3,854,314 | 12/1974 | Martin | 72/125 X |
| 4,186,584 | 2/1980 | Schott | 72/122 |
| 4,216,569 | 8/1980 | Stiller et al. | 29/727 X |
| 4,235,013 | 11/1980 | Vollmer | 29/727 |
| 4,319,472 | 3/1982 | Martin | 72/122 |
| 4,407,150 | 10/1983 | Kelly | 29/727 X |

Primary Examiner—Howard N. Goldberg
Assistant Examiner—Ronald S. Wallace
Attorney, Agent, or Firm—D. M. Satina

[57] ABSTRACT

Sleeves inserted in the coolant conductors of a steam generator of a nuclear-reactor plant are rolled by remotely controlled apparatus minimizing the time which personnel must spend within the radioactive environment of the channel head of the steam generator. A sleeve is rolled by a tube provided with rolls which are normally retracted and which, during a rolling operation, are extended into rolling engagement with the sleeve by a rotating tapered mandrel. The mandrel advances into the tube rotating the rolls while progressively increasing the pressure between the rolls and the sleeve. The sleeve is rolled near its upper end and also at its lower end in its region which is within the tube sheet by upper and lower rolling tools. The tube carrying the rolls is moved into the sleeve by a remotely controlled drive. The drive is a low voltage motor for the upper tool and a hydraulically driven piston for the lower tool. When the tube reaches its uppermost position in contact with the tube sheet or the end of the sleeve in the coolant conductor the mandrel is automatically actuated, responsive to the actuation of a switch to move into the tube to extend the rolls in the tube into progressively increasing pressure engagement with the sleeve and also to rotate as it moves into the tube. The translational drive for the mandrel is a low voltage electric motor for the upper tool and a pneumatically driven piston for the lower tool. The rotational drive for both tools is a hydraulic motor. That the desired upper rolling has been reached, is automatically determined by a thrust bearing on the mandrel which stops the advance of the mandrel into the tube at a proper diameter of the mandrel. The lower rolling is stopped responsive to the reactive torque of the hydraulic motor and may also be stopped by timing. In either case the three drives are reversed. The mandrel, in a direction opposite to its motion during insertion, is retracted, the rolls are removed from engagement with the sleeve and the tube is moved out of the sleeve.

22 Claims, 27 Drawing Figures

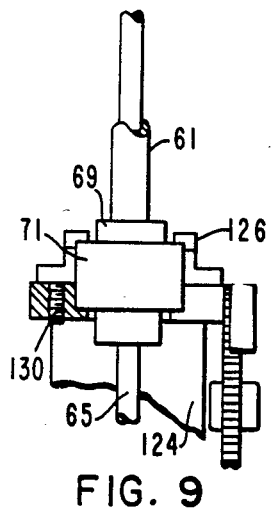
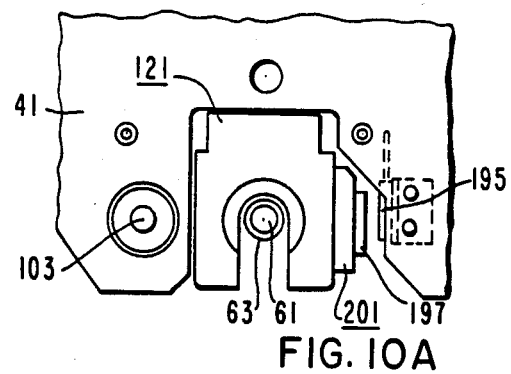
FIG. 9
FIG. 10A
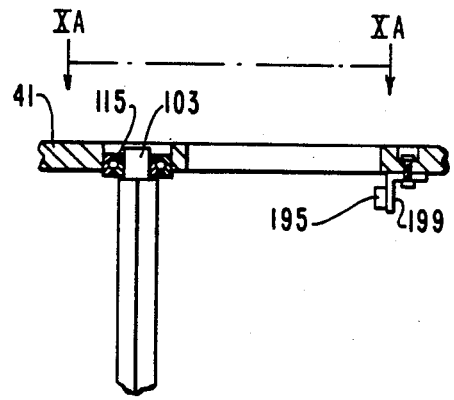
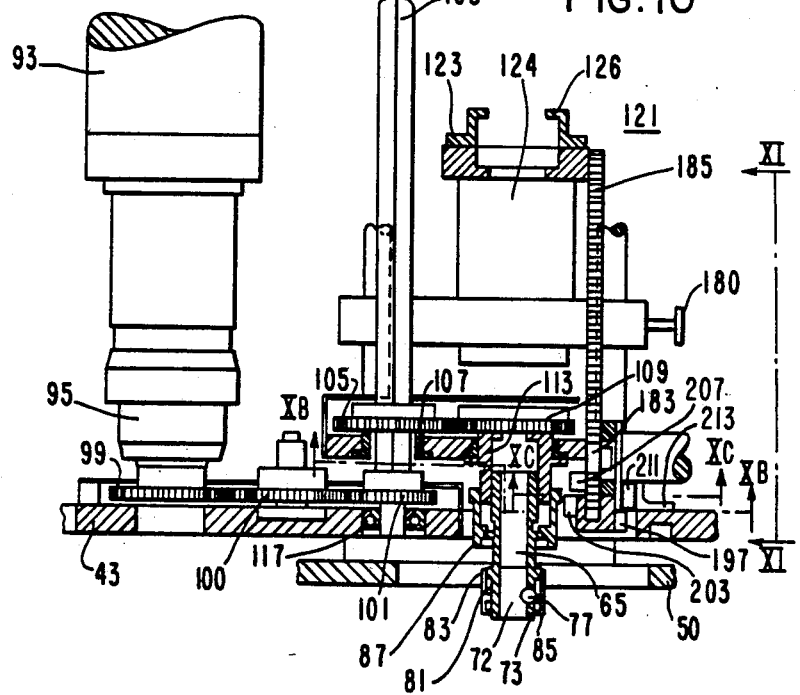
FIG. 10

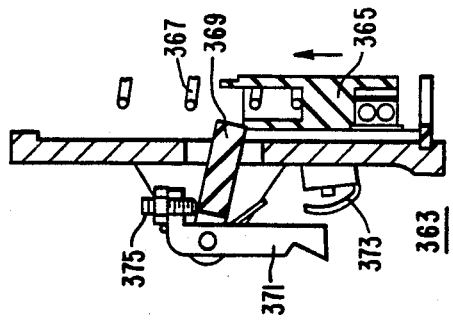
FIG. 23
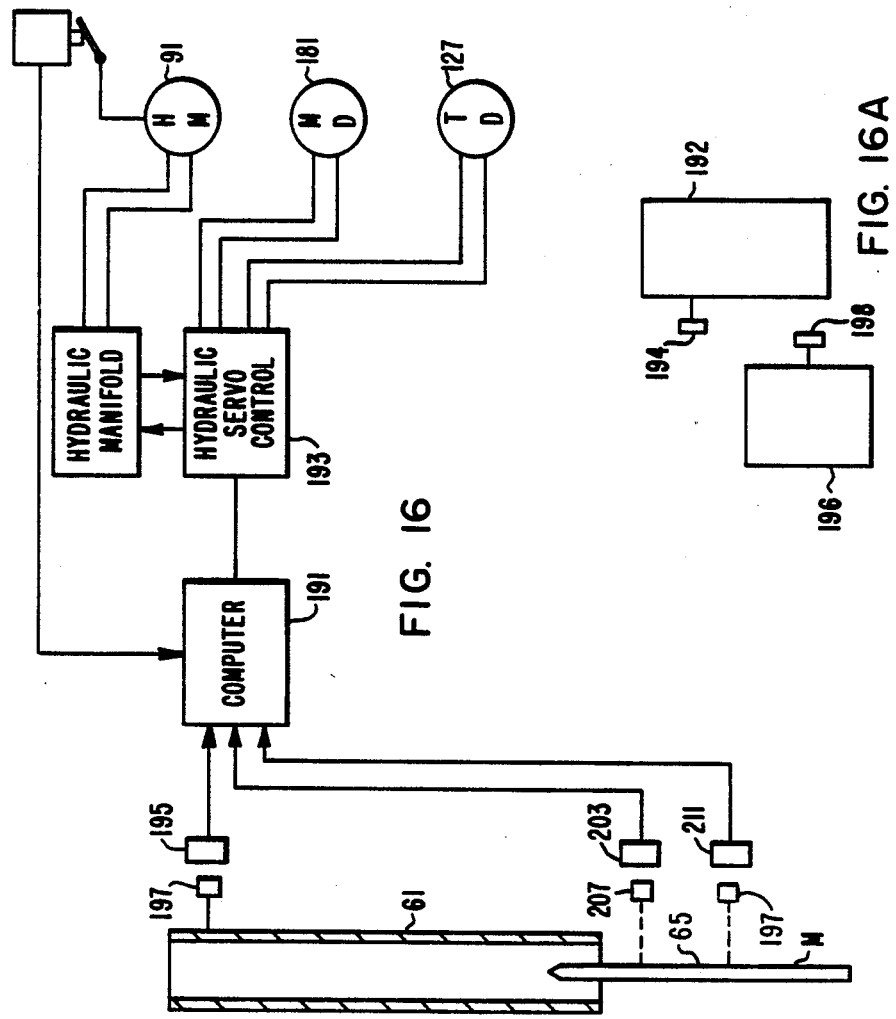
FIG. 16
FIG. 16A

APPARATUS FOR SLEEVING TUBES IN HOSTILE ENVIRONMENTS

REFERENCE TO RELATED APPLICATION

Application Ser. No. 538,305 filed Oct. 3, 1983 by Frank W. Cooper et al. for Sleeving of Tubes of Steam Generator and assigned to Westinghouse Electric Corporation, is incorporated herein by reference (herein Cooper).

BACKGROUND OF THE INVENTION

This invention relates to the art of sleeving fluid carrying conductors. It has particular relationship to the sleeving of the corroded or damaged conductors which carry the coolant; i.e. the primary conductors, of the steam generator of a nuclear reactor plant.

To repair the corroded coolant conductors of a steam generator, sleeves are inserted into the conductors. The sleeves are of different lengths, typically 27, 30, 36 or 44 inches. The lower end of each sleeve is coincident with the lower end of the coolant conductor in which it is inserted. A sleeve, once inserted, is expanded typically near its upper end and near its lower end in a region within the tube sheet. After being expanded the sleeve is rolled in the top and bottom regions so that a mechanical joint is formed between the sleeve and the conductor. Typically a sleeve is rolled over a length of about 2¼" at the lower end and 1½" at the upper end. Each joint formed by the rolling should be capable of effectively resisting the penetration between the outer surface of the sleeve and the inner surface of the corroded or damaged coolant conductor, of the high pressure coolant, which will flow through the sleeve and through the coolant conductor beyond the sleeve. This invention concerns itself with the rolling of the top and bottom of the sleeve; i.e., the upper end of the sleeve and the part of the sleeve in the tube sheet.

Access to the coolant conductor for rolling of the sleeve is available through the channel head of the steam generator. The environment within the channel head is radioactive so that the time within which personnel may work therein is limited, typically 15 to 45 minutes. After an exposure within a channel head, exposed personnel cannot enter a radioactive environment for several months. Apparatus which is used within a radioactive channel head also becomes radioactively contaminated. In addition the channel head is composed of metal and use of apparatus which requires electrical voltages exceeding about 30 volts within the channel head is prohibited to avoid hazards of electrical shocks to personnel.

In accordance with the teachings of the prior art the rolling was carried out wih a hand tool. This tool included a tube having extendable rolls, sometimes referred to herein, as roller means, in a region thereof. Within the tube a tapered mandrel was provided. The tapered mandrel could be moved by hand axially into the tube to press the rolls into rolling engagement with the sleeve. The mandrel was rotatable by an air motor. As the operator started pressing the mandrel into the tube he started the motor so that the mandrel rotated, rotating the rolls while the mandrel was entering the tube. After the rolling was completed the tube and mandrel were removed from the sleeve.

This prior art rolling operation was difficult to carry out and time consuming. If one operator could not carry out the complete rolling in the alloted exposure time, it was necessary to replace him with another operator.

It is an object of this invention to overcome the disadvantages and drawbacks of the prior art in the rolling of sleeves in fluid conductors in a hostile environment and to provide rolling apparatus or roller tools, which shall be remotely automatically actuable, for carrying out a complete rolling operation with minimal intervention of personnel.

SUMMARY OF THE INVENTION

In accordance with this invention there is provided rolling apparatus, sometimes referred to herein as a tool, including a tube having rolls in a region thereof. The expression "coolant conductors" to designate the primary tubes of a steam generator is used in this application to distinguish these conductors from the tubes which carry the rolls for rolling the sleeves. The tube is movable by a remotely actuable drive into the sleeve with its rolls at the level of the region to be rolled. There is a tapered mandrel which is advanced or retracted axially within the tube by a remotely actuable drive. This mandrel is also rotatable by another drive. Responsive to the positioning of the roll tube in its setting in which its rolls are at the level of the region being rolled, the advancing and retracting drive and the rotating drive for the mandrel are automatically actuated.

The mandrel engages the rolls and drives them, progressively under higher pressure, into the sleeve. Since substantial power is required in the rolling, the drive for rotating the mandrel is a hydraulic motor. It is conceivable that a low-voltage electric motor could be used but such a motor would be large. The rolling must be stopped after the sleeve reaches a predetermined maximum diameter to preclude blowout of the sleeve and coolant conductor at the upper region of the sleeve for which there is an upper tool or excessive attenuation of the sleeve at the lower region of the sleeve for which there is a lower tool. In the case of the rolling of the upper region of the sleeve, the rolling may be stopped automatically responsive to the distance of penetration of the mandrel into the tube. In addition the timer is provided to limit the time the mandrel remains in its most extended position. The level in the sleeve which the mandrel reaches is set to achieve the desired rolling without blowout. The lower rolling may also be stopped by a timer or a stop. The lower roller may also be stopped by a mechanism which operates when the reactive torque of the motor reaches a predetermined magnitude. In each case the drive which rotates the mandrel and the advancing and retracting drive are automatically reversed so that the mandrel is rotated in the opposite direction and is retracted. The rolls are at an angle to the axis of the tube so that reversal of the mandrel drive facilitates the extraction of the mandrel from the tube. The available power of the advancing-and-retracting drive is usually not sufficient by itself to extract the mandrel from the tube. Automatically responsive to the return of the mandrel to its initial position in the tube, the tube and mandrel are withdrawn to their starting position.

Each tool when in use is mounted on a coordinate transport as disclosed in Cooper. Each tool is held firmly by locking pins in coolant conductors adjacent the conductor which is being rolled.

This invention is uniquely suitable for the rolling of sleeves in coolant conductors of the steam generator of a nuclear reactor plant. The invention may also serve in plants and systems of other types, for example in the hazardous environment of chemical plants. Such use in plants of other types than nuclear-reactor plants is within the scope of equivalents of this invention.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 9 is a fragmental view partly in section and partly in side elevation showing the relationship of the tube and the mandrel of the apparatus shown in FIG. 1;

FIG. 10 is a view in section taken along lines X—X of FIG. 4;

FIG. 10A is a view in end elevation taken in the direction XA—XA of FIG. 10;

FIG. 16 is a block diagram showing the limit or proximity switch circuit which controls the apparatus shown in FIG. 1;

FIG. 16A is a block diagram showing a modification of this invention;

FIG. 23 is a fragmental view in section showing the mechanism which operates in response to the reactive torque of the hydraulic motor.

DETAILED DESCRIPTION OF THE EMBODIMENTS

Figure 5:
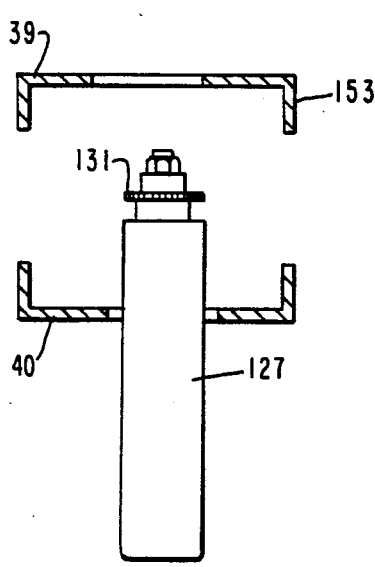
FIG. 5 is a view in transverse section taken along line V—V of FIG. 1.

FIGS. 1 through 16 show apparatus 31 for rolling the upper region of a sleeve 33 inserted in a coolant conductor 35 of a steam generator of a nuclear-reactor plant. The coolant conductor 35 extends into a tube sheet 37. This apparatus includes a support formed of channel sections 39 and 40. These channels support a top plate 41 and a bottom plate 43. Near the top, these channels supports a vertical plate 45 (FIG. 2). An adapter plate 47 is connected to the vertical plate 45 through a tubular spacer 49. The adapter plate 47 serves to suspend the assembly 31 from the carriage or a coordinate transport (See Cooper). A fail-safe plate 50 is bolted below the lower plate 43. (FIGS. 5, 8). This plate carries a limit switch (not shown) which stops the coordinate transport if the fail-safe plate 50 engages the wall of the channel head in which a coolant conductor is being rolled.

Lockpin assemblies 51 and 53 (FIG. 1) are suspended from both ends of the upper plate 41 externally of the channels 40 and 41. Each assembly 51 and 53 includes a cylinder 55 within which a piston (not shown) is movable. Each piston is connected through a piston rod (not shown) to a lockpin 57 which extends through an opening 59 (FIG. 2) in plate 41. The locking pins 57 are advanced from, or retracted into, plate 41 depending on the direction of the supply of fluid into the respective cylinders 55. As disclosed in Cooper, the lockpins 57 are at the start of a rolling operation, injected into coolant conductors 35, adjacent the coolant conductor to be rolled, and locked firmly in these adjacent conductors thus locking the tool 31 to the sheet 37.

Figure 1:
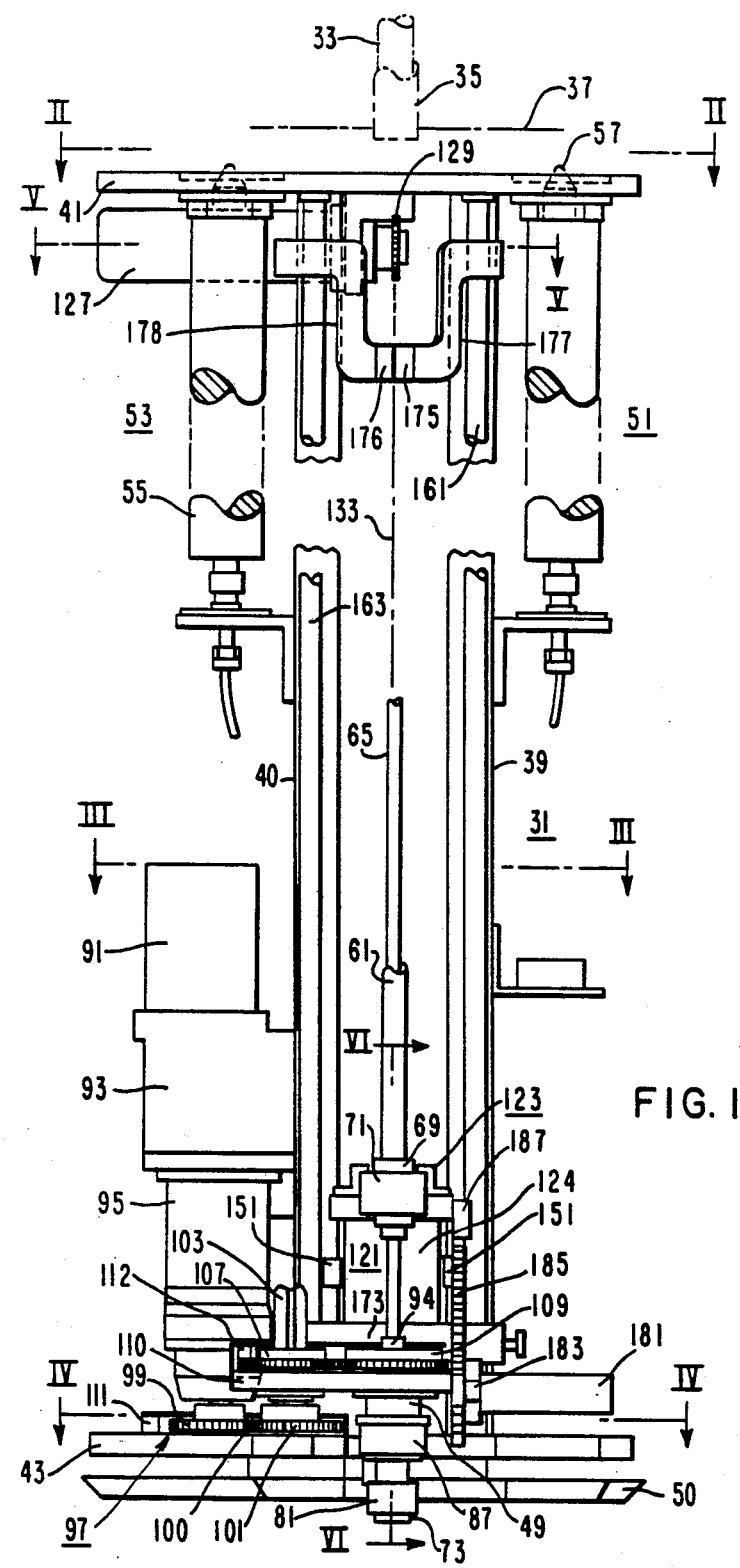
FIG. 1 is a view in front elevation of a tool or apparatus in accordance with this invention, for the upper rolling of a sleeve.
Figure 2:
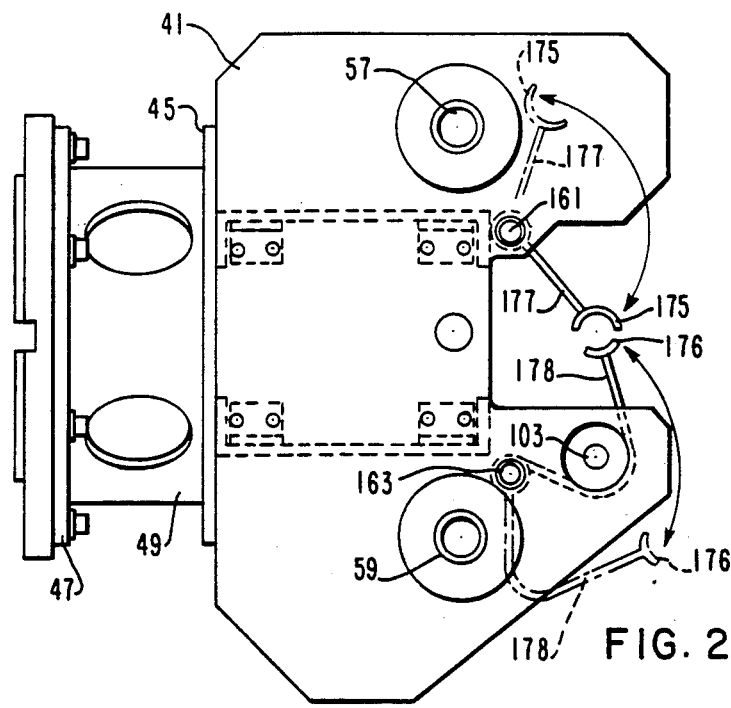
FIG. 2 is a plan view of this tool taken in the direction II—II of FIG. 1.
Figure 6:
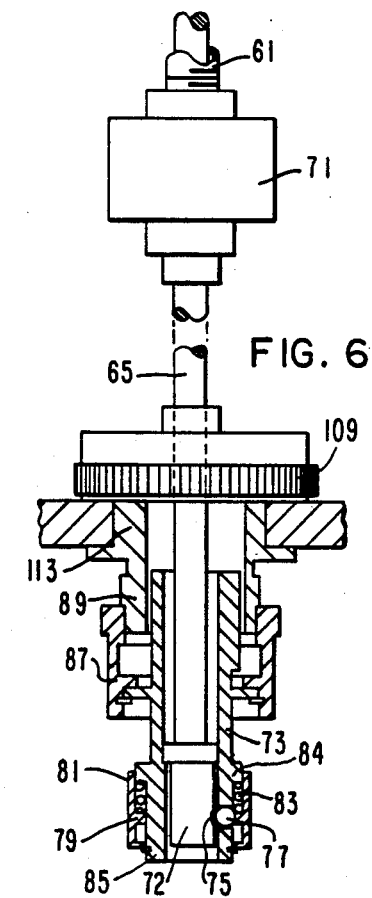
FIG. 6 is a view in longitudinal section taken along line VI—VI of FIG. 1.
Figure 10B:
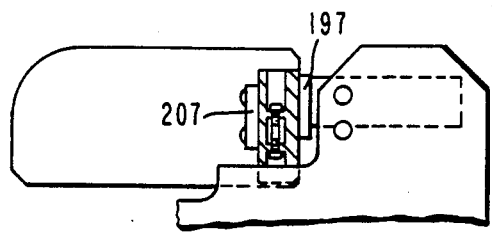
FIG. 10B is a view in section taken along line XB—XB of FIG. 10.
Figure 12:
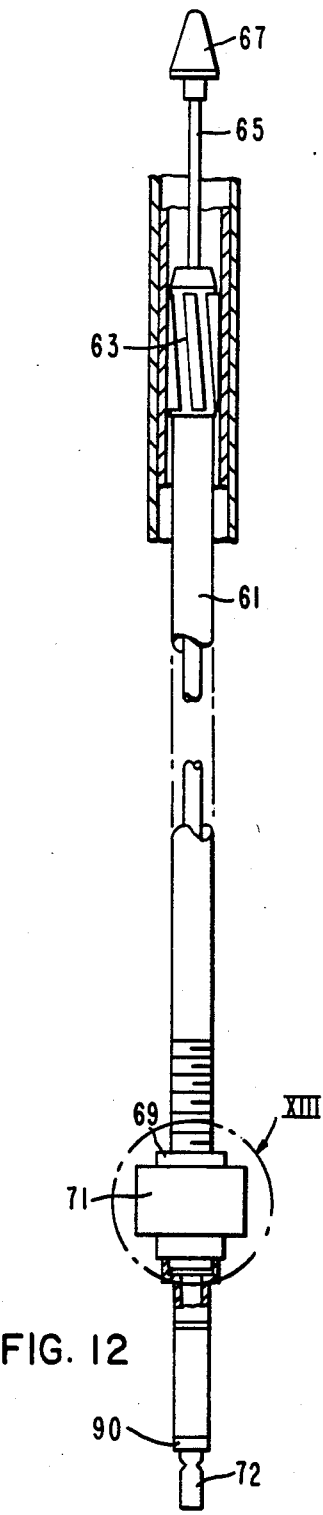
FIG. 12 is a view in side elevation of the tube-mandrel assembly of the apparatus shown in FIG. 1.
Figure 13:
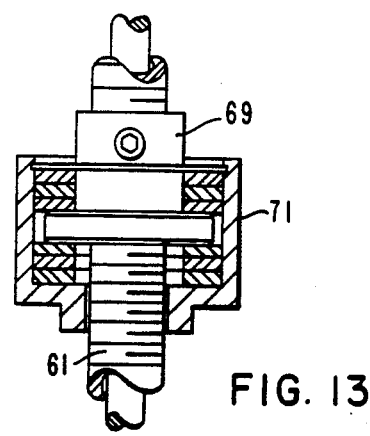
FIG. 13 is a view in section enlarged of the portion of the assembly of FIG. 12 in the circle XIII.
Figure 14:
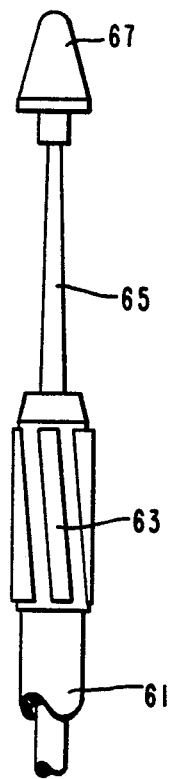
FIG. 14 is a fragmental view of the region of the tube of the apparatus shown in FIG. 1 which includes the rolls.

To carry out a rolling operation there is provided a tube 61 having captive rolls 63 in the upper region thereof (FIGS. 1, 12, 13, 14). The rolls 63 are normally retracted into the surface of tube 61 but are extensible by a tapered mandrel 65 which extends axially through the tube 61 coaxial with the tube. As shown in FIG. 14, the rolls 63 extend at an angle to the axis of tube 61. As the tapered mandrel 65 advances progressively into tube 33, the rolls 63 extend more and more progressively outwardly from the surface of the tube. The mandrel has a conical nose 67 at the top to facilitate insertion into the tube 61. The tube 61 is screwed into, and secured in, a collar 69 (FIGS. 1, 12) supported on a thrust bearing 71 and is thus supported on the thrust bearing (FIG. 13). The mandrel 65 passes through the tube 61 and the bearing 71 and below the bearing has a tang 72 which extends into a seat or chuck 73 (FIGS. 6, 10). Near its lower end, the mandrel has a groove 75 into which a ball bearing 77 extends through a hole in the seat 73. The ball 77 is releasably held in the groove by an inward projection 79 from a sleeve 81. The sleeve 81 is positioned so that it engages the ball 77 by a spring 83 which is compressed between a shoulder 84 on seat 73 and the projection 79. The downward displacement of the sleeve 81 is limited by a retaining ring 85. It is at times necessary to replace the mandrel 65. On such occasions, the sleeve 81 is pressed upwardly against the force of the spring 85 releasing the ball 77 and enabling the removal of the mandrel. The mandrel 65 can be adjusted vertically relative to the tube 61 by an adjustable bushing 87. The bushing 87 may be screwed upwardly or downwardly on an externally-threaded annular member 89. Near its lower end the mandrel has a shoulder 90 (FIG. 12). The shoulder supports a sleeve 92 which carries a thrust bearing 94 (FIGS. 1, 12). The assembly including the mandrel 65, the shoulder 90, the sleeve 92 and the thrust bearing 94 is movable relative to the tube 61 and the bearing 71 so that the length of the sleeve 92 can be changed to vary the penetration of the mandrel 65 into tube 61, the sleeve is made of two parts separated by spacer 96.

For rotating the mandrel 65 a hydraulic motor 91 is provided (FIG. 1). The motor 91 drives the mandrel through a speed reducer 93, a torque-responsive clutch mechanism 95 and a gear train 97. The motor 91, gear reducer 93 and torque mechanism 95 are mounted on a bracket 98 (FIG. 3) connected to channel 40. The gear train 97 includes a gear 99 on the motor drive shaft, an idler gear 100 which meshes with gear 99 and a gear 101. Gear 101 drives a shaft 103 of square cross section. A driving gear 105 for the mandrel 65 is mounted with its hub 107 slidable along shaft 103. This gear 105 drives a gear 109 connected to the mandrel 65. The bearings (not shown) for gears 105 and 109 are in a table 110 provided with a cover 112 (FIG. 8). The table forms part of the carriage 121. In lieu of the shaft 103 of square cross section, a splined shaft of circular cross section may be used. In this case a key on the hub 107 would engage the spline slidably along the shaft. The gears 99, 100 and 101 are provided with a cover 111 which extends from base 43 over the gears. The threaded member 89 (FIG. 6) extends integrally from the hub 113 of gear 109. The shaft 103 rotates in bearings 115 and 117 in the top plate 41 and the bottom plate 43 (FIG. 10).

Figure 3:
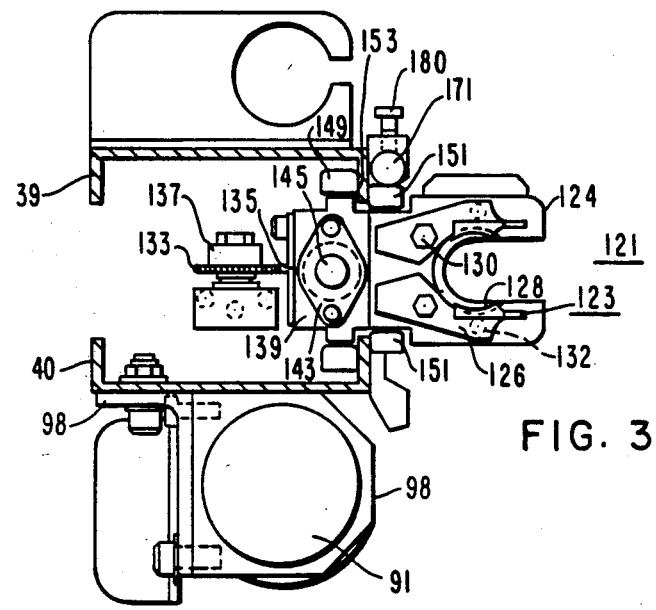
FIG. 3 is a view in transverse section taken along line III—III of FIG. 1.
Figure 4:
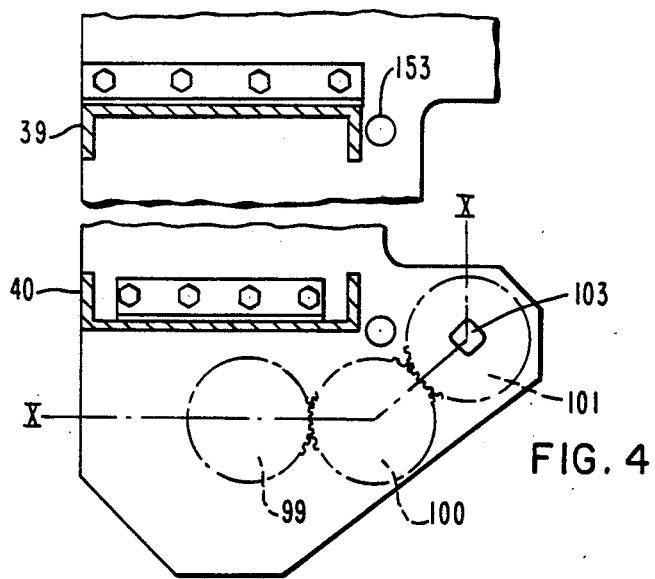
FIG. 4 is a view in transverse section taken along line IV—IV of FIG. 1.

The assembly (FIG. 1), including the gears 105 and 109, the roll tube 61, the thrust bearing 71, the mandrel 65 and the parts associated with the mandrel including the chuck 73, the sleeve 81 and the bushing 87, are mounted on the carriage 121. The carriage 121 is provided with a seat assembly 123 (FIG. 3), which engages, and securely holds, the thrust bearing 71. The main support member of the carriage is an angle plate 124. The seat assembly 123 includes arms or latches 126 (FIG. 3) having, near their ends, seats 128 formed to engage the circular surface of the thrust bearing 71. The arms 126 are pivotal manually in opposite directions on pivot pins 130 on the upper side of angle plate 124. The angle plate carries pins 132 which are urged by springs (not shown) into grooves in the arms. The spring-pressed pins 132 hold the arms in the retracted position or in the position in which the seats 128 engage the bearing 71. A low-voltage electric motor 127 (FIGS. 1, 3, 8) drives the carriage 121 upwardly or downwardly through sprocket wheels 129 and 131 and a chain 133. The motor 127 is supported in a bracket 135 secured to the plate 41 (FIG. 8) just below the upper plate 41. The chain is maintained taut by a tensioner 137. A bearing block 139 extends inwardly, with respect to channels 39 and 40 (FIG. 3), from the carriage 141. The bearing block carries a bearing 143 which rides on a vertical guide rod 145 for the carriage. At its lower end the bearing block is engageable by a stop collar 147 (FIG. 7) which extends from the lower plate 43. The carriage is also maintained aligned by rollers 149 and 151 which extend respectively from the bearing block and the carriage 121 and ride on the outer flanges 153 of the channels 39 and 40 (FIG. 3).

Figure 11:
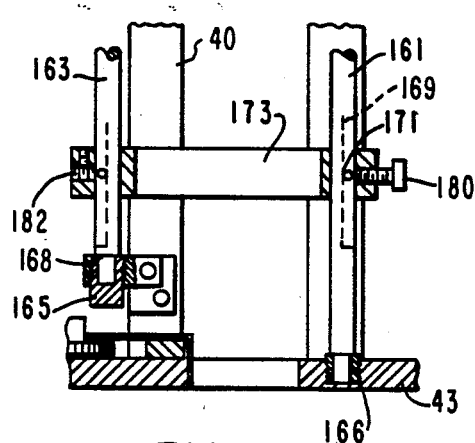
FIG. 11 is a fragmental view partly in section and partly in side elevation taken in direction XI—XI of the lower part of FIG. 10 and showing the lower part of the apparatus shown in FIG. 1.
Figure 15:
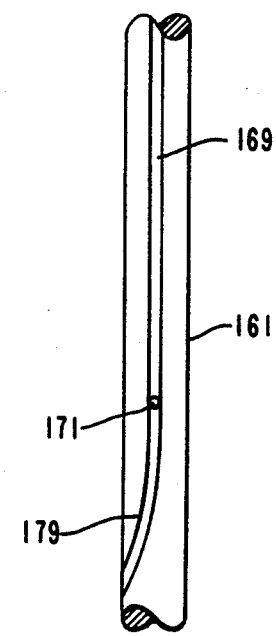
FIG. 15 is a fragmental view showing a portion of a splined rod which guides the tube as it is raised or lowered.
Figure 17:
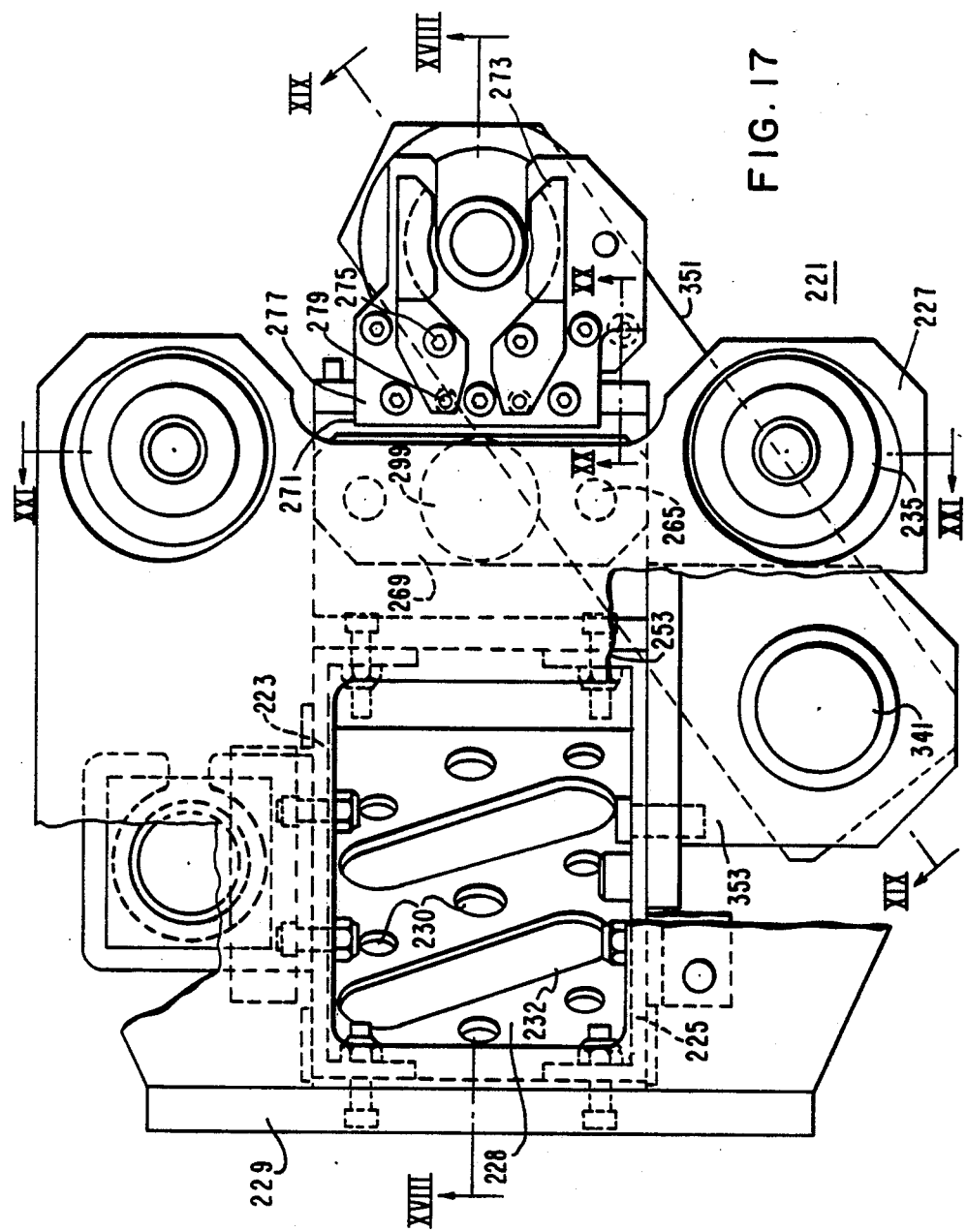
FIG. 17 is a plan view of the tool in accordance with this invention for the lower rolling.

Splined rod-guides 161 and 163 extend between upper and lower plates 41 and 43 on one side and between plate 41 and follow guide holder 165 on the opposite side. Guide holder 165 is suspended from channel 40 (FIG. 11). Bearings 166 and 168 are provided in the plate 43 and guide holder 165. The splines 169 are engaged by pins 171 secured in a cross member 173 of the carriage 121 (FIGS. 11, 15). To facilitate removal of the roller tube assembly 61, 63, 65, a pin 171 in the spline 169 of one guide extends from a hand retractable plunger 180 (FIG. 3); the other is held by a set screw 182.

It is essential that the roll tube 61 be aligned with the sleeve 33 which it is to roll. This alignment is accomplished by fingers 175 and 176 on finger guides 177 and 178 under table 41 (FIGS. 1, 2). Each guide 177 and 178 has the general form of the lower part of a leg with the fingers 175 and 176 extending from the foot and encircling the tube 61. Above (to the left or right of) the knee each guide encircles and engages a corresponding splined guide rod 161 or 163. The finger guides 177 and 178 and the fingers 175 and 176 are not alike (FIG. 2). Guide 178 includes a loop around shaft 103. Finger 175 extends over a large angle of the periphery of tube 61; finger 176 extends over a smaller angle (FIG. 2). Each spline 169 extends directly in an axial direction from the top to a point spaced a predetermined distance from the bottom of the rods 161 and 163. The portion 179 of the spline 169 from the bottom extends at an angle to the axis (FIG. 15). With the carriage 121 in the lower-most position, the finger guides 177 and 178 are set so that the fingers 175 and 176 engage the tube 61 and maintain the tube aligned. As the carriage 121 is raised from the lowermost position, the pins 171 coact with the spline portions 179, which operate as cams, to rotate the rods 161 and 163 swinging the guides 177 and 178 outwardly to a position where the guides are out of the path of the carriage 121. When the carriage 121 is at the position where the fingers 175 and 176 are withdrawn, the roll tube 61 is well within the sleeve 33 and is maintained aligned by the sleeve. The carriage 121 can now be advanced without interference from the guides 177 and 178. The carriage is moved to a position where the collar 69 (FIGS. 1 and 9) abuts the end of the coolant conductor 35 being sleeved which extends from the tube sheet 37. In this position of tube 61, the rolls 63 are the level of the region of sleeve 33 which is to be rolled.

Figure 7:
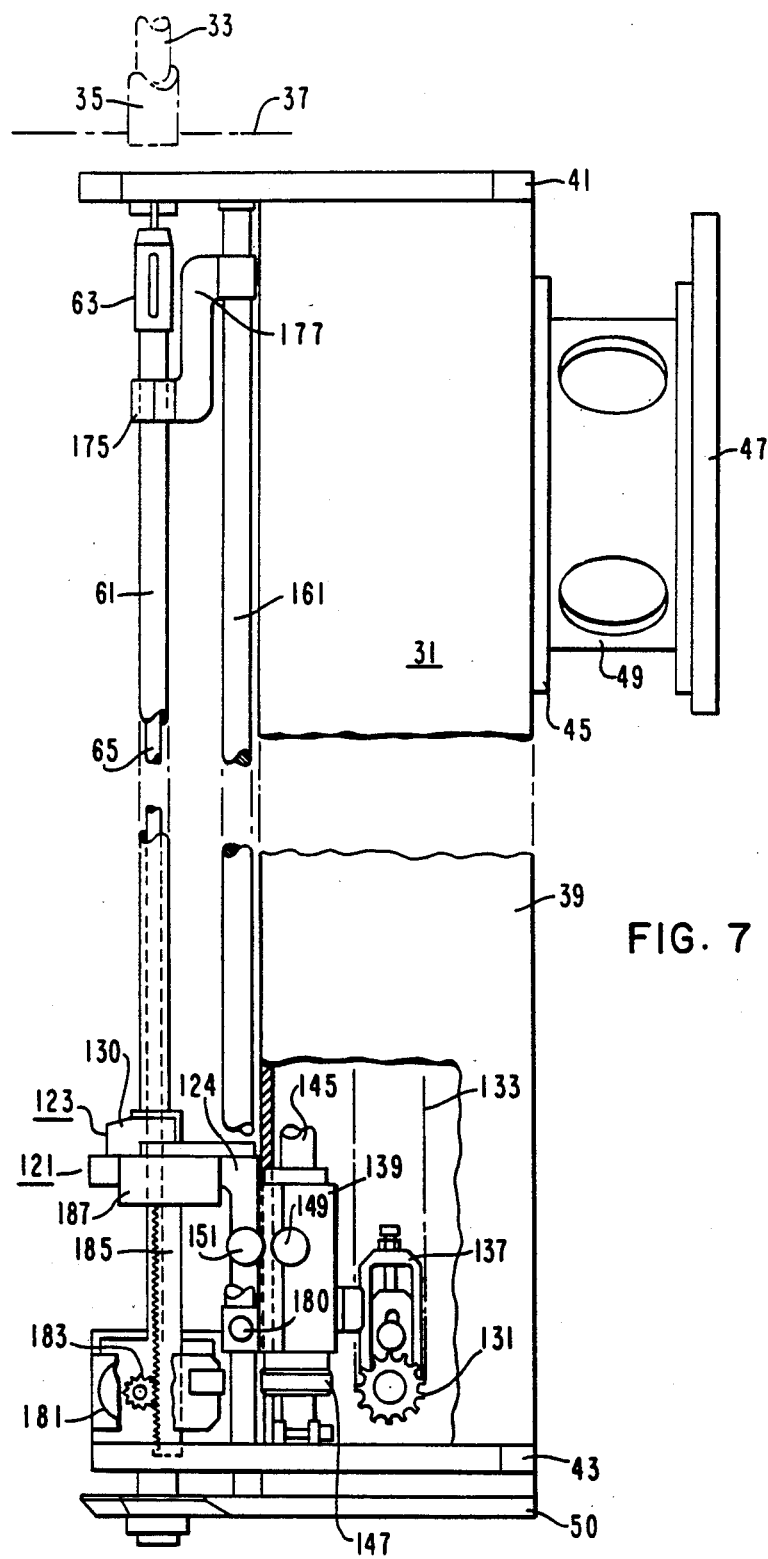
FIG. 7 is a view in side elevation of the tool as seen from the right side of FIG. 1.
Figure 8:
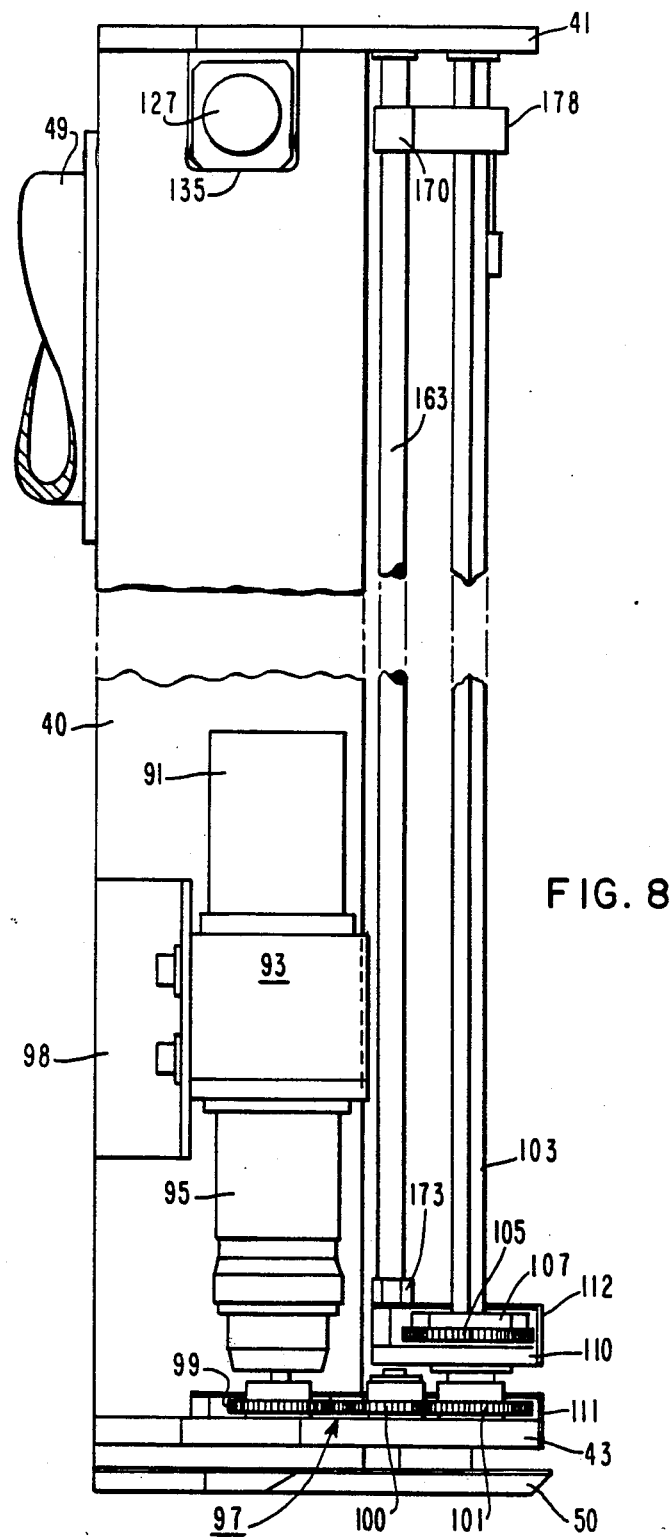
FIG. 8 is a view in side elevation of the tool as seen from the left side of FIG. 1.

The mandrel 65 is advanced into the tube 61, to extend and rotate the rolls 63 by a low-voltage electric motor 181 which is mounted on the carriage 121 (FIGS. 1, 7). The drive shaft of the motor 181 carries a pinion 183 which engages a rack 185 supported on bracket 187 secured to carriage 121. When the motor 181 is energized, the pinion 183 is driven along rack 185 carrying with it the table 110, the gears 107 and 109 and mandrel 65 and its associated parts. With hydraulic motor 91 energized, the drive gear 107 is rotated by square assembly 109, 73, 87, 49 driving shaft 109 and rotating the mandrel.

In the practice of this invention proximity limit switches are provided to initiate the successive steps of operation (FIG. 16) responsive to the positioning of the roll tube 61 and the mandrel 65. The proximity switches are operated by magnets carried by the carriage 121 and by parts movable with the mandrel 65.

The operation of the apparatus is initiated by a command from computer 191 (FIG. 16; see also Cooper) impressed on the hydraulic servo control (HSC) 193. The motor 127 is energized, raising the carriage 121 and the tube 61 and mandrel 65 and the other parts mounted on the carriage. When the carriage 121 is raised to the position at which collar 69 abuts the end of the coolant conductor 35 being sleeved, proximity switch 195 is actuated by magnet 197 which moves with carriage 121 (FIGS. 10, 10A). Switch 195 is suspended below plate 41 by angle 199. Magnet 197 is carried on a block 201 secured to carriage 121. Actuation of switch 195 transmits a signal to the computer 191. The computer commands the motor 127 to be deenergized and to energize the hydraulic motor 91 and motor 181. The tapered mandrel 65 is advanced into the tube 61 by motor 181 extending the rolls 63 progressively in higher and higher pressure-contact with the sleeve. At the same time the mandrel 65 is rotated by motor 91 rotating the rolls 63. Below the thrust bearing 71 there is the thrust bearing 94 (FIG. 1, 12) which is carried by sleeve 92 in the mandrel 65. As the mandrel penetrates into tube 61 a shoulder 90 on the mandrel raises the bearing 94 until it contacts bearing 71. At this point the penetration of the mandrel into the tube is stopped. The mandrel and bearing 94 are shown in the retracted position in FIG. 1 and in the advanced position in FIG. 12.

On being actuated by switch 195 the computer 191 starts timing of a time interval which is usually longer than the time taken for bearing 94 to contact bearing 71. At the end of the interval the computer 191 commands the HSC 193 to reverse hydraulic motor 91 and motor 181. The direction of rotation of the mandrel 65 is reversed and the mandrel is retracted or withdrawn from the tube 61. The reversal of the direction of rotation of the mandrel facilitates its retraction. Typically the motor 181 does not have sufficient power to retract the mandrel 65 without the aid of the reversal. The time interval is set so as to preclude excessive heating of the sleeve and tube. The blowout is precluded by the limitation of bearing 94 of the penetration of the mandrel. The rolling should form a mechanical seal, between the rolled portion of the sleeve and the contiguous portion of the coolant conductor which effectively, prevents the penetration of coolant between the sleeve and coolant conductor.

The penetration of the mandrel 65 into the tube 61 is also monitored by a proximity switch. This switch is adjustable along a part 192 (FIG. 16A) carried by the carriage 121 with port respect to which the mandrel 65 is movable. A part 196 carried with the pinion 183, which moves generally parallel to the part on which the adjustable switch 192 is mounted, carries a magnet 198 which actuates the adjustable switch when the mandrel 65 has penetrated to the desired position in the tube 61. The motors 91 and 181 are then reversed by the computer. This proximity switch verifies that the operation is proceeding properly.

Figure 10C:
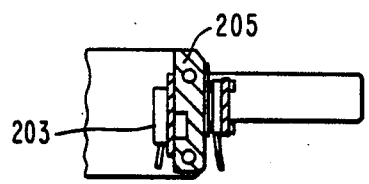
FIG. 10C is a view in section taken along line XC—XC of FIG. 10.

A proximity switch 203 is also mounted on a mounting block 205 (FIG. 10C). This switch is actuable by a magnet 207 movable with the pinion 183. When the mandrel 65 reaches a lower level at which magnet 207 actuates switch 203, the computer responds to the signal from this switch by commanding the HSC to deenergize motors 91 and 181 and to energize motor 127. The carriage 121 is moved downwardly removing the tube 61 from the sleeve 33. With the mandrel 65 withdrawn and the rolls 63 retracted, the tube is readily removed from the sleeve.

A proximity switch 211 (FIG. 10) is mounted on an angle 213 secured to lower plate 43. When the carriage 121 reaches its lowermost position, magnet 197 actuates limit switch 211 deenergizing motor 127 and otherwise resetting the apparatus. The rolling operation is now completed. The sleeve 33 is rolled typically over a length of 1¼ inches.

Figure 18:
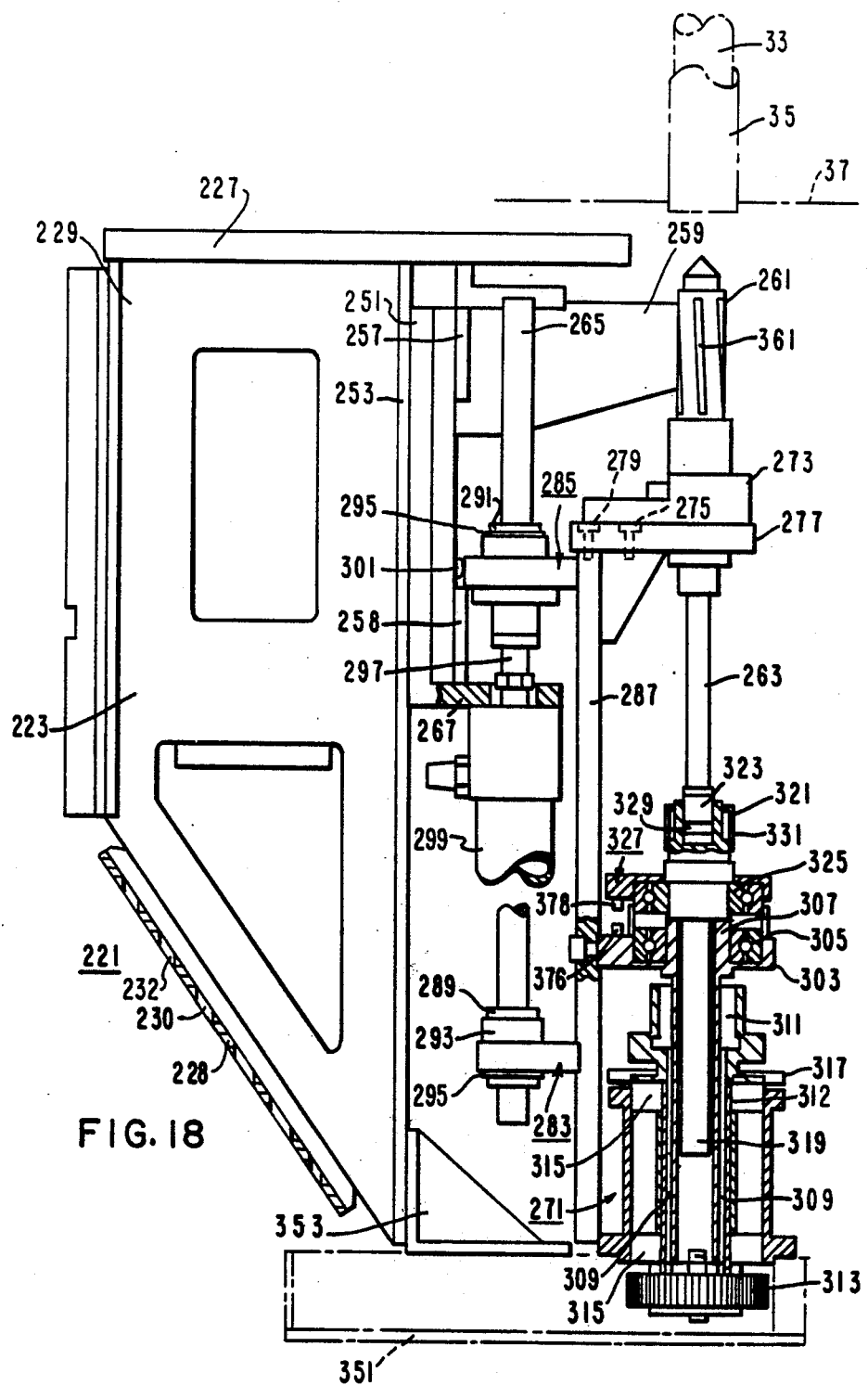
FIG. 18 is a view in section taken along line XVIII—XVIII of FIG. 17.
Figure 19:
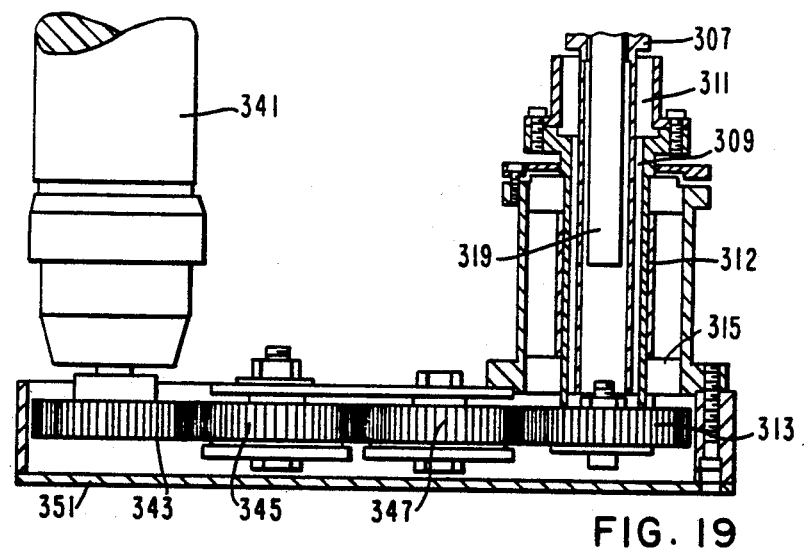
FIG. 19 is a view in section taken along line XIX—XIX of FIG. 17.
Figure 20:
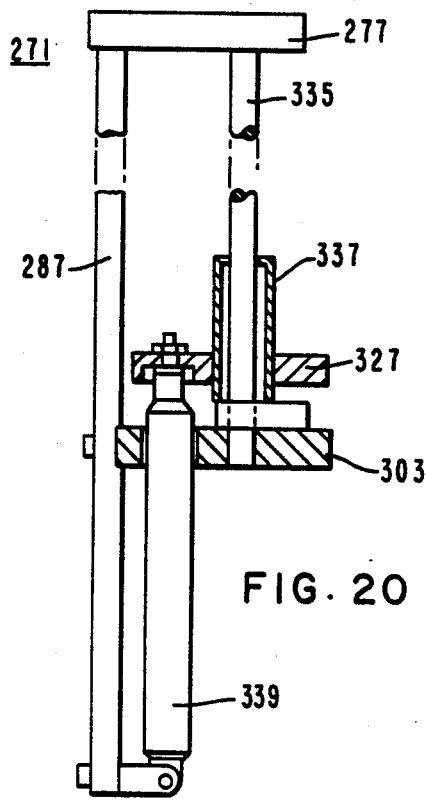
FIG. 20 is a view in section taken along line XX—XX of FIG. 17.

FIGS. 17 through 23 show apparatus 221 for low rolling of a sleeve 33 in a coolant conductor 35 (FIG. 18). This apparatus includes a support formed of channels 223 and 225. A top horizontal plate 227 (FIG. 18) is mounted across channels 223 and 225. A plate 228 (FIGS. 17, 18) is secured at an angle across the channels 223 and 225. This plate 228 has guide holes 230 for the fluid and electrical cables which serve the tool 221 and large elongated holes 232 permitting access to the underside of the tool. A vertical plate 229 is secured across members 223 and 225 extending from a point just below the top plate 227 to a point below the horizontal center plane of the tool 221. The plate 229 serves to suspend the apparatus 221 from the coordinate transport (described in Cooper) when the apparatus is to carry out a low rolling operation.

Figure 21:
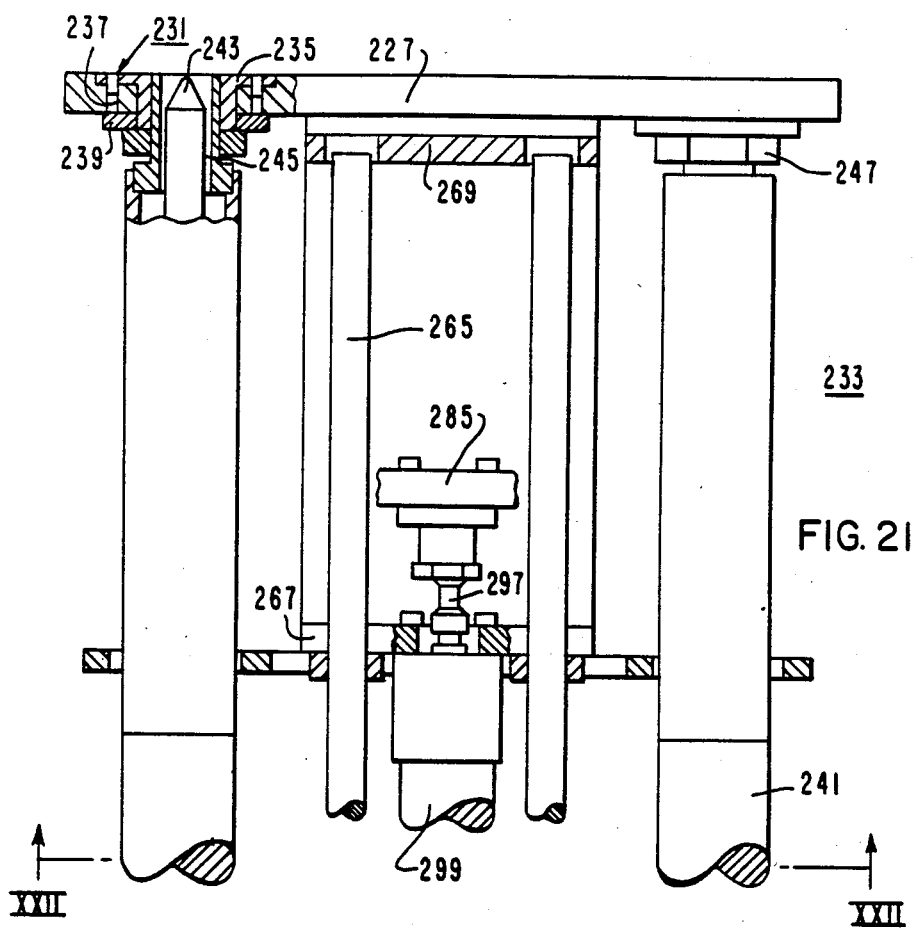
FIG. 21 is a view in section taken along line XXI—XXI of FIG. 17.
Figure 22:
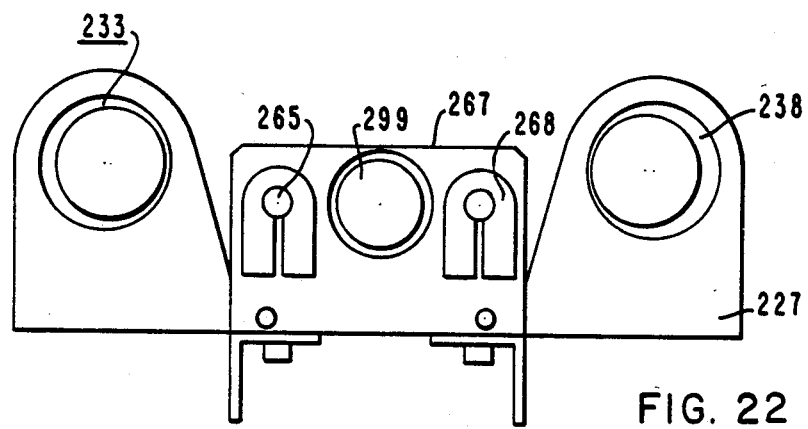
FIG. 22 is a fragmental view in end elevation taken in the direction of line XXII—XXII of FIG. 21.

Near each of its ends along its width in the front portion, the top plate 227 is provided with a housing 231 for suspending a lockpin assembly 233 (FIG. 21). This housing 231 includes an internally threaded flanged sleeve 235 secured to the plate 227 by pins 237 extending from a ring 239 abutting the plate 227. The pins extend through the flange of the sleeve 235. The lockpin assembly 233 includes a cylinder 241 within which a piston (not shown) is moved upwardly or downwardly by a fluid. The piston rod (not shown) attached to the piston moves a lockpin 243 upwardly or downwardly. An externally threaded shell 245 extending from the cylinder 241 is screwed into the sleeve 235 and is secured by a nut 247 and locked against ring 239. The lockpins are inserted by upward movement of the piston and locked in coolant conductor adjacent to the conductor 33 being rolled and preclude the disengagement of the tool 221 from the sleeve during rolling by the reactive forces exerted in the tool. The desired location of the lockpin assembly may be set by inserting the pins 237 in different holes. As shown in FIG. 22 such adjustment is feasible because the holes 238 in top plate 227 are of larger diameter than the cylinders 241.

In the upper part of the apparatus 221, a channel bracket 251 (FIG. 18) is supported from the flanges 253 of the channels 223 and 225. This bracket 251 carries an adapter plate 255. Near the top and bottom of this plate magnetically operable proximity switches 257 and 258 are mounted. This plate 255 also carries a bracket 259 for a spray nozzle (not shown) for cooling the roll tube 261 and the mandrel 263 between successive rolling operations. Guide rods 265 (FIGS. 17, 18, 21) are secured to the lower flange 267 of the channel bracket 251, by rod clamps 268 (FIG. 22) and extend into the upper flange 269.

The roll tube 261 (FIG. 18) and the tapered mandrel 263 are supported on a vertical carriage 271 having an angular structure. Latches 273 are pivotal on pins 275 on the horizontal member 277 of the carriage. Spring actuable pins 279 extend into grooves in the stems of the latches 273. The latches 273 are pivotal between a retracted position and a position in which they engage the thrust bearing 281 which supports the roll tube 261.

Plate assemblies 283 and 285 extend rearwardly from the vertical member 287 of the carriage 271. With reference to FIG. 18, the front of the tool 221 is on the right. The word rear refers to regions leftward of the front. Each assembly 283 and 285 carries ball bushings 289 and 291 which are movable along the respective guide rods 265. Each bushing 289 and 291 are secured in sleeves 293, which form a part of the assemblies, by retaining rings 295. The lower plate assembly 283 serves only as a mounting for bushings 289. The upper plate assembly 285 serves as a mounting for bushings 291 and in addition is connected to the piston rod 297 from the piston (not shown) in hydraulic cylinder 299. The fluid in cylinder 299 moves piston rod 297 upwardly or downwardly driving the carriage 271 and the roll tube 261 and mandrel 263 upwardly or downwardly through the plate assembly 285. The plate assembly 285 also carries a magnet 301 which operates switches 257 and 258 with the carriage 271 in the fully-up or fully-down position. The cylinder 299 is suspended from plate 267.

A plate 303, extending towards the front of the tool 221, is supported on vertical member 287 below its center. Plate 303 supports a ball bearing 305 (FIGS. 18, 19) in which a hollow drive shaft 307 is rotatable. Externally the drive shaft carries keyways 309 along its length. Internally, drive shaft 307 is of square transverse cross section. The keyways 309 are engaged by keys 311 extending from a drive sleeve 312 rotatable by gear 313 on ball bearings 315 held by retainer ring 317. The square boundary of the drive shaft 307 is engaged by a tang 319. At its top this tang carries a chuck 321 which is engaged by a square tang 323 on the lower end of the mandrel 263. When the drive shaft 307 is rotated, the tang 319 and the chuck which it carries are rotatable in ball bearings 325 carried by plate assembly 327. The tang 323 is held by a ball (not shown) which is held in a groove 329 in the tang by a sleeve 331 urged upwardly by a spring 333. By pressing the sleeve downwardly the ball is disengaged from groove 329 releasing the mandrel 263 so that it may be removed or replaced.

Guide rods 335 (FIG. 20) are mounted between plate 303 and the horizontal member 277 of the carriage 271. The plate assembly 327 is provided with ball bushings 337. The ball bushings 337 engage rods 335. Plate assembly 327 is movable along these rods on these bushings. As it is moved upwardly or downwardly plate assembly 327 carries with it tang 319 and the mandrel 263 and its associated parts. These parts are rotable by drive shaft 307 while they move upwardly or downwardly. The upward or downward movement of plate 327 and the parts attached to it is effected by a piston (not shown) driven by air cylinder 339. This cylinder is supported on the vertical member 287.

Gear 313 is driven by hydraulic motor 341 (FIG. 19) through a train of gears 343, 345 and 347. The gears 313 through 349 are mounted in a gear casing 351 supported on a bracket 353 suspended from the flanges 253 of the channels 223 and 225 (FIG. 18).

To carry out a rolling operation, the hydraulic cylinder 299 is supplied with fluid to raise carriage 271 and tube 261 and mandrel 263 and their associated parts on guide rod 265 so that tube 261 penetrates into the sleeve 33 within the tube sheet. Plate assembly 285 is raised with carriage 271. When magnet not shown is near proximity switch 257, pneumatic cylinder 339 is actuated and motor 341 is energized. While the motor rotates mandrel 263, it is advanced into tube 261 extending the rolls 361 into the sleeve 33 and rolling the sleeve.

Motor 341 has a torque responsive mechanism 363 (FIG. 23). This mechanism includes an actuating bracket 365 which is held retracted by a spring 367 when motor 341 is deenergized. As the rolls 361 are extended progressively into the sleeve 33 by the tapered mandrel 263, the reactive torque on the motor 341 is increased. Bracket 365 advances leftward against the pressure of spring 367. Sensing finger 369 is pivoted in a counterclockwise direction with reference to FIG. 23. Finger 369 is linked to switch-actuating arm 371 and pivots this arm counterclockwise, closing microswitch 373 when the reactive torque produced by the pressure of rolls 361 on sleeve 33 reaches a predetermined magnitude. The magnitude may be set by adjustment screw 375. When switch 373 is closed, the hydraulic motor 341 is reversed and the air in cylinder 339 is supplied in a direction such as to retract mandrel 263 from tube 361. When the mandrel reaches its lowermost position a proximity switch 376 is actuated by a magnet 378 reversing the movement of the piston in cylinder 299, moving carriage 271 downwardly and retracting to roll tube 261. The actuation of switch 376 also stops motor 341. When the carriage 271 reaches its lowermost position magnet 301 actuates switch 258 and the rolling operation is completed. The proximity switches 257 and 258 and the switch 373 operate through computer 191 in the same manner as the control components for the upper rolling. The switch 373 transmits the intelligence that it has been closed to the computer 191. The computer commands the mandrel retracting operation. During the retraction switch 373 is opened without affecting the progress of the retraction operation.

While several embodiments of this invention have been disclosed herein, many modifications thereof are feasible. This invention should not be restricted except insofar as is necessitated by the spirit of the prior art.

We claim:

1. A remotely-actuable apparatus for rolling a selected region of a sleeve of a corroded or damaged coolant conductor housed within the radioactive environment of a steam generator of a nuclear-reactor power plant; the said apparatus including a tube having therein transversely extensible and retractable roller means; remotely-actuable means, connected to said tube for moving said tube into and out of said sleeve; a mandrel; remotely-actuable means, connected to said mandrel, for advancing said mandrel relative to said tube into, and retracting said mandrel from, said tube, said advancing-and-retracting means being set in the standby condition of said apparatus with said mandrel retracted from said tube; remote-actuable means, connected to said tube and mandrel, for locking said apparatus with said tube and mandrel in position to roll said sleeve without the necessity that the apparatus be held by personnel during the rolling operation; remotely-actuable means, connected to said advancing-and-retracting means and responsive to the positioning of said tube, by inward movement by said moving means, with said roller means at the level of said selected region of said sleeve, for advancing said mandrel into said tube, said mandrel being dimensioned to extend said roller means into engagement with said sleeve as said mandrel advances into said tube; remotely-actuable means, connected to said mandrel, for rotating said mandrel in driving engagement with said roller means to rotate said roller means in rolling engagement with said sleeve; and remotely-actuable means, connected to said tube and mandrel, for retracting said tube and said mandrel after predetermined rolling of said selected region of said sleeve.

2. The apparatus of claim 1 wherein the tube-moving means includes a first electric motor and the means for advancing the mandrel relative to the tube includes a second electric motor and the mandrel rotating means includes a hydraulic motor, the first and second electric motors operating at a relatively low electric voltage not hazardous to personnel.

3. The apparatus of claim 1 wherein the tube-position responsive means is connected to the mandrel rotating means to initiate the rotation of the mandrel substantially at the same time as it initiates the advance of the mandrel into the tube.

4. The apparatus of claim 1 wherein the mandrel is tapered so that as it advances in engagement with the roller means, the pressure between the roller means and the selected region of the sleeve is progressively increased, progressively increasing the reactive torque of the rotating means, the said apparatus including means, automatically responsive to the reactive torque of the rotating means, for stopping the advance of the mandrel into the tube.

5. The apparatus of claim 1 wherein the mandrel is tapered so that as it advances into engagement with the roller means, the extending of the roller means into engagement with the selected region of the sleeve is progressively increased, the said apparatus including means, connected to said mandrel for stopping the advance of the mandrel into the tube after the extending of the roller means has reached a predetermined magnitude corresponding to the desired rolling of the selected region of the sleeve.

6. The apparatus of claim 5 remotely-actuable including means, connected to the mandrel-advancing-and-retracting means, for retracting the mandrel from the tube after the advance of said mandrel has been stopped, the said apparatus also including means, connected to the rotating means, for reversing the rotation of the mandrel to reverse the rotation of the roller means when said mandrel is being retracted from said tube.

7. The apparatus of claim 5 wherein the stopping means includes means, automatically responsive to the reactive torque on the rotating means which increases as the extending of the roller means into engagement with the selected region of the sleeve increases, to stop the advance of the mandrel into the tube when said reactive torque reaches a predetermined magnitude corresponding to the desired rolling of the selected region of the sleeve.

8. The apparatus of claim 5 wherein the stopping means includes timing means, connected to the mandrel advancing-and-retracting means for reversing the rotation of the mandrel and starting its retraction from the tube a predetermined time interval after the rotation and the advance into the tube is started.

9. The apparatus of claim 1 wherein the mandrel rotating means is mounted laterally of the tube and mandrel and drives the mandrel through a gear train whose gears are generally perpendiclar to the axis of the tube and mandrel.

10. The apparatus of claim 1 wherein the roller means are at an angle to the axis of the tube.

11. A remotely-actuable apparatus for rolling a selected region of a sleeve inserted in a corroded or damaged coolant conductor housed within the radioactive environment of a steam generator of a nuclear-reactor power plant; said apparatus including a carriage; a tube mounted on said carriage; roller means mounted in said tube in a region thereof; said roller means when actuated, being movable from a retracted position to an extended position; a mandrel mounted on said carriage and movable within said tube, relative to said tube, between a retracted position and an advanced position, said mandrel, when in said advanced position, actuating said roller means to be extended into engagement with said sleeve; remotely-actuable-means, connected to said tube and mandrel, for locking said apparatus with said tube and mandrel in position to roll said sleeve without the necessity that the apparatus be held by personnel during the rolling operation; remotely-actuable first drive means, connected to said carriage, for moving said carriage between a retracted position and an advanced position in which the tube is injected into said sleeve; remotely-actuable second drive means, connected to said mandrel, responsive to the advance of said tube to an advanced position in which said roller means is at the level of said selected region of said sleeve, for moving said mandrel to an advanced position within said tube, to actuate said roller means to said extended position into engagement with said sleeve in said selected region; remotely-actuable third drive means, connected to said mandrel, for rotating said roller means, while said roller means is in engagement with said sleeve in said selected region, to roll said selected region of said sleeve; and remotely-actuable means, connected to said first, second and third drives, for automatically reversing said drive means to remove said tube and mandrel from said sleeve after predetermined rolling of said sleeve.

12. The apparatus of claim 11 wherein the first drive means and the second drive means are electric motors operating at an electric voltage of low magnitude not hazardous to personnel and the third drive means is a hydraulic motor.

13. The apparatus of claim 11 wherein the first drive means includes a piston, connected to the carriage, actuable by fluid to move the carriage, the second drive means includes a piston connected to the mandrel actuable by fluid to move the mandrel to the advanced position, and the third drive means is a hydraulic motor.

14. The apparatus of claim 13 wherein the piston of the first drive means is hydraulically actuable and the piston of the second drive means is pneumatically actuable.

15. The apparatus of claim 11 wherein the tube-advance responsive means is connected to the third drive means to initiate the rotation of the mandrel substantially at the same time as the advance of the mandrel into the tube is initiated.

16. A remotely-actuable apparatus for rolling a selected region of a sleeve of a corroded or damaged coolant conductor housed within a radioactive environment of a steam generator of a nuclear-reactor power plant; the said apparatus including a tube having therein transversely extensible-and-restractable roller means; remotely-actuable means, connected to said tube, for moving said tube in and out of said sleeve; guiding means, to be connected to said tube, for aligning said tube with said sleeve; means, connected to said guiding means and responsive to the movement of said tube into said sleeve, for removing said guiding means from the path of said moving means after said tube has advanced into said sleeve; a mandrel; remotely-actuable means, connected to said mandrel, for advancing said mandrel relative to said tube into, and retracting said mandrel from, said tube, said advancing-and-retracting means being set in the standby condition of said apparatus with said mandrel retracted from said tube; means, connected to said advancing-and-retracting means, and responsive to the positioning of said tube, by inward moving of said moving means, with said roller means at the levels of said selected region of said sleeve, for advancing said mandrel into said tube, said mandrel being dimensioned to extend said roller means into engagement with said sleeve as it advances into said tube; remotely-actuable means, connected to said mandrel, for rotating said mandrel in driving engagement with said roller means to rotate said roller means in rolling engagement with said sleeve; and remotely-actuable means, connected to said tube and mandrel, for retracting said tube and said mandrel after predetermined rolling of said selected region of said sleeve.

17. The apparatus of claim 16 including rotatable guide rod means having spline means along the length thereof, means, connecting the moving means to the spline means of the guide rod means, so that when the moving means moves the tube into the sleeve the guide rod means is rotated, and means connecting the guiding means to the guide rod means, so that when the guide rod means is rotated the guiding means is moved out of the path of the moving means.

18. A remotely-actuable apparatus for rolling a selected region of a sleeve of a corroded or damaged coolant conductor housed within the radioactive environment of a steam generator of a nuclear-reactor power plant; the said apparatus including a tube having therein transversely extensible and retractable roller means; remotely-actuable means, connected to said tube, for moving said tube in and out of said sleeve; a mandrel; remotely-actuable means, connected to said mandrel for advancing said mandrel relative to said tube into, and retracting said mandrel from, said tube, said advancing-and-retracting means being set in standby condition of said apparatus with said mandrel retracted from said tube; remote-actuable means, connected to said advancing-and-retracting means and responsive to the positioning of said tube, by inward movement of said moving means, with said roller means at the level of said selected region of said sleeve, for advancing said mandrel into said tube, said mandrel being dimensioned to extend said roller means into engagement with said sleeve as said mandrel advances into said tube; remotely-actuable means, connected to said mandrel, for rotating said mandrel in driving engagement with said roller means to rotate said roller means in rolling-engagement with said sleeve; and remotely actuable means, connected to said tube and mandrel, for retracting said tube and said mandrel after predetermined rolling of said selected region of said sleeve, said retracting means including means, connected to said rotating means, for reversing the rotation of said mandrel when said tube and mandrel is being retracted from said sleeve.

19. The apparatus of claim 18 wherein the remotely-actuable means for advancing and retracting the mandrel is a low-voltage electric motor which does not have sufficient power alone when it is reversed to retract the mandrel after it is advanced into the tube.

20. The apparatus of claim 19 wherein the roller means is at an angle to the axis of the tube whereby by reversing the direction of rotation of the mandrel, the tube is "unscrewed" from the sleeve.

21. The apparatus of claim 20 wherein the rotating means includes a hydraulic motor and a shaft connected to said motor to be rotated thereby and the mandrel-rotating means includes gear means slidable on said shaft but rotatable therewith, said gear means being connected to said mandrel to rotate said mandrel in the second position as said gear means is rotatable by said shaft.

22. A remotely-actuable apparatus for rolling a selection region of a sleeve of a corroded or damaged coolant conductor housed within a radioactive environment of a steam generator of a nuclear-reactor power plant, the said apparatus including a fixed support; a tube having therein transversely extensible and retractable roller means; remotely-actuable means, supported by said support and connected to said tubes, for moving said tube into and out of said sleeve; a mandrel; remotely-actuable means, mounted moveable on said support and connected to said mandrel, for advancing said mandrel relative to said tube into, and retracting said mandrel from, said tube; said advancing-and-retracting means being set in a standby condition of said apparatus in a first position relative to said support remote from said sleeve with said mandrel retracted from said sleeve; remotely-actuable means, connected to said advancing-and-retracting means and responsive to the positioning of said tube, by inward movement by said moving means, with said roller means at the level of said selected region of said sleeve, for setting said advancing-and-retracting means in a second position near said sleeve and for actuating said advancing-and-retracting means to advance said mandrel into said tube, said mandrel being dimensioned to extend said roller means into engagement with said sleeve as said mandrel advances into said tube; remotely actuable rotating means, fixedly supported on said support; means connected to said rotating means and to said mandrel, for rotating said mandrel in driving-engagement with said roller means when said advancing and retracting means is set in said second position, to rotate said roller means in rolling engagement with said sleeve; and remotely-actuable means, connected to said tube, for retracting said tube and said mandrel after predetermined rolling of said selected region of said sleeve.

* * * * *